Figure 1:
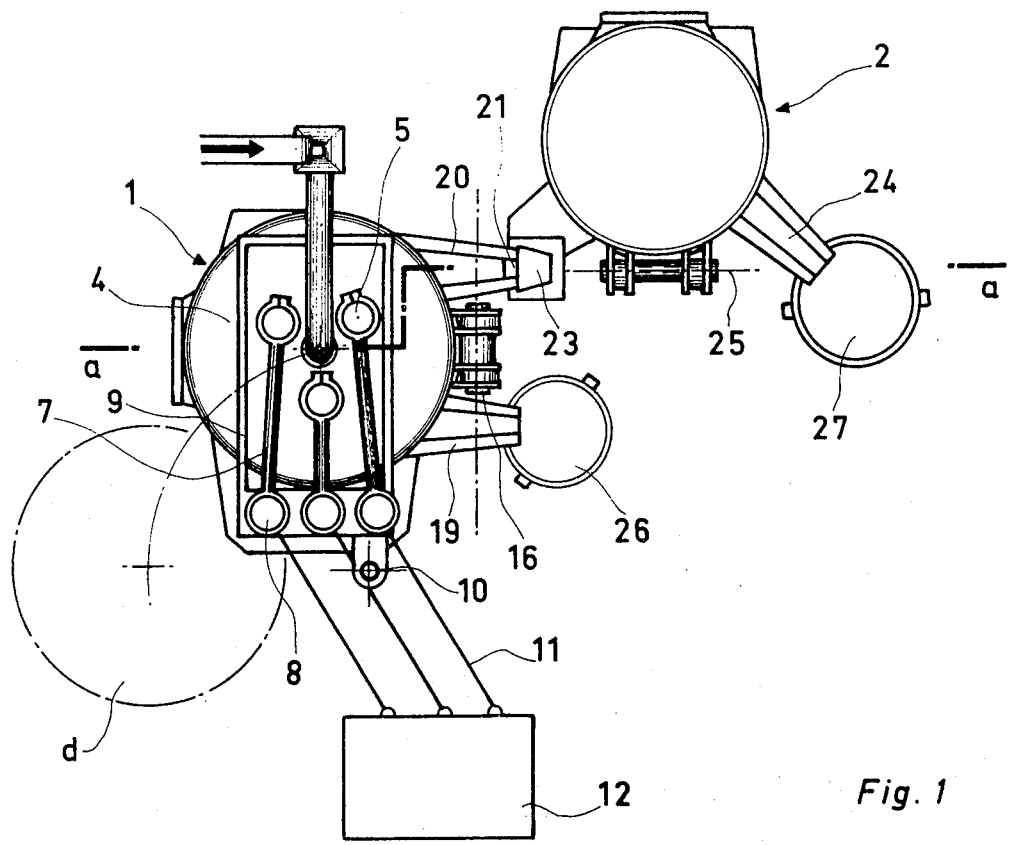

United States Patent [19]
Antoine et al.

[11] 3,898,365
[45] Aug. 5, 1975

[54] ELECTRIC ARC FURNACE FOR MELTING AND REFINING SOLID METAL PRODUCTS

[76] Inventors: Jacques Antoine, 66, rue des Chesnay, 57 - Longeville-les-Metz; Pierre Vayssiere, 87 bis, rue Georges Ducrocq, 57 - Metz; Hugues Zanetta, 81, rue G. Hermann, 57 - St-Julien-les-Metz, all of France

[22] Filed: Jan. 25, 1974

[21] Appl. No.: 436,457

[30] Foreign Application Priority Data
Feb. 21, 1973 France .............................. 73.06071

[52] U.S. Cl. ..................................................... 13/10
[51] Int. Cl. ........................... F27d 3/14; F27d 3/15
[58] Field of Search .............................. 13/10, 34, 33

[56] References Cited
UNITED STATES PATENTS
2,355,095   8/1944   Moore ................................... 13/10
3,599,953   8/1971   Smith ................................. 13/33 X
3,626,072   12/1971  Haralampiev et al ............... 13/33 X FOREIGN PATENTS OR APPLICATIONS
562,042   6/1944   United Kingdom .................... 13/10

Primary Examiner—R. N. Envall, Jr.
Attorney, Agent, or Firm—Kurt Kelman

[57] ABSTRACT

In steel making apparatus, solid metal products rich in iron are melted and refined in a first furnace having two spouts for evacuating the resultant liquid metal from the furnace into a second adjoining furnace having an inlet port cooperating with one of the spouts to effectuate the continuous transfer of the liquid metal to the second furnace by siphon effect. The first furnace is pivotal about a horizontal axis disposed laterally in respect thereof and in the immediate proximity of the respective ends of the evacuating spouts.

1 Claim, 2 Drawing Figures

ELECTRIC ARC FURNACE FOR MELTING AND REFINING SOLID METAL PRODUCTS

The present invention relates to a metallurgical apparatus for melting and refining solid products rich in iron to transform them into liquid steel, and more particularly to an electric arc furnace used for refining scrap iron, for example.

The melting and refining operations in an electric furnace are usually performed successively in the same furnace by proper furnace control and feeding of raw materials as a function of the conditions of operation. In addition to this conventional type of operation, it has also been proposed to use the electric furnace essentially only for melting the scrap iron or the like and then to evacuate the liquid metal into an adjoining refining vessel, which process may be performed in a continuous manner. In the first-mentioned conventional operation, the slag formed during the refining step must be removed by pivoting the furnace. On the other hand, if the electric furnace is used solely for continuous melting and the molten metal is refined in an adjoining stage, the furnace is stationary, the molten metal is continuously removed to the refining stage, and the slag formed during melting is removed simply by skimming it off the top. This continuously operating electric furnace apparatus differs fundamentally from the conventional batch operation.

Despite the notable advantages of the continuous operation wherein the metal is molten in a stage distinct from the refining stage, it may be desirable under certain circumstances to have recourse to the conventional batch operation. It may also prove advantageous to select a semi-continuous type of operation wherein a batch of metallic material is first molten in an electric arc furnace in the same manner as the beginning of the conventional batch operation and the entire molten charge is then transferred to an adjoining refining stage, making the furnace ready for the next batch to be molten.

The choice of the type of operation preferred depends, in the first place, on the nature of the solid products being molten and refined but also, to a certain extent, on the quality and quantity of the steel to be produced. The conventional batch process or the semi-continuous method lend themselves particularly to the treatment of heavy scrap iron. The continuous method is better adapted to the treatment of conditioned scrap iron or pre-reduced metal products. The usefulness of one or the other refining method depends obviously on prevalent conditions of supply in respect of quantity as well as price. It is known that these conditions fluctuate widely. Considering the considerable investment required in the installation of metallurgical apparatus, it is essential to cut down costs to a minimum and to assure the best use of installed apparatus. The need has arisen, therefore, to provide an apparatus which is capable of adaptation to selected ones of the types of operations outlined hereinabove.

The principal conditions such an all-purpose apparatus must meet are:

1. The possibility of pivoting the furnace forwards and backwards to permit evacuation of the molten metal and removal of the slag, thus permitting the apparatus to operate in the conventional manner.

2. Compatibility with the continuous operating method, i.e., the possibility of associating the electric arc furnace which constitutes the melting stage in the latter type of operation with a furnace constituting the second or refining stage of the operation.

3. The possibility of using the second stage in a semi-continuous type of operation.

A two-stage type of installation is known wherein a first furnace is equipped with a discharge spout and a second furnace adjoins the first furnace, the first furnace being arranged for pivoting about a horizontal axis disposed in the proximity of the end of the discharge spout. Such a pivoting furnace is described, for instance, in U.S. Pat. No. 1,680,237.

The refining furnace of such a two-stage installation is generally a closed vessel to permit the metallurgical operations therein to proceed under good thermal conditions and protected from the atmosphere. Therefore, such a vessel has a relatively small inlet port for the molten metal coming from the first or melting stage of the installation.

If the above-described technology involving a pivoting first furnace is used, it must be compatible with the two stages of the installation. Such an installation cannot be readily adapted to continuous or semi-continuous operation. If such an installation is to function in the conventional batch operation, the second furnace must be displaced, which constitutes a substantial complication, particularly if this furnace is large, or a detachable discharge channel must be provided to assure flow of the liquid metal from the first to the second furnace. The latter solution proves to be unsatisfactory because the metal evacuated from the first furnace is increasingly susceptible to oxidation as the discharge path between the two furnaces increases in length. Furthermore, in a continuous operation, the liquid metal evacuated from the first furnace usually is not superheated and may solidify in a long discharge channel.

It is the primary object of the present invention to overcome the various inconveniences cited hereinabove while permitting operation of the same furnace as the first stage of a two-stage type of installation either as a melting apparatus, with transfer of the molten metal to a second stage where the molten metal is subjected to complementary metallurgical operation, such as refining in a continuous or semi-continuous manner, or as melting and refining apparatus in a conventional batch operation.

The above and other objects are accomplished in accordance with this invention with a first furnace for melting and refining the solid products and having two spouts for evacuating the resultant liquid metal from the furnace, and a second furnace adjoining the first furnace and having an inlet port. The first furnace is arranged for pivoting about a horizontal axis disposed laterally in respect of the first furnace to permit transfer of the liquid metal from the first to the second furnace. The pivoting axis is disposed in the immediate proximity of the ends of the respective evacuating spouts, and one of the spouts is arranged to cooperate with the inlet port of the second furnace to effectuate the transfer.

The first furnace is preferably an electric arc furnace with a movable vaulted roof. This vaulted roof may define a port for continuously feeding solid products rich in iron to the furnace.

An apparatus built on the concept of the invention may be operated batch-wise, semi-continuously or continuously, as desired. By combining in the first furnace the features of two evacuating spouts for liquid metal and pivoting about a horizontal axis passing close to the ends of the spouts, a second furnace may be fixedly disposed in the immediate proximity of the end of one of the spouts. This second furnace may cooperate with the first furnace functioning essentially as a melting vessel when the apparatus is used as a two-stage installation with a semi-continuous or continuous operation. The first furnace may, however, also be used for the entire operation, with the molten and refined metal being evacuated through the other spout.

Another advantage resides in the fact that the metal may be evacuated from the first furnace into two receiving vessels simultaneously in any selected type of operation. This possibility is of considerable interest when it is desired to proceed with metallurgical operations of different kinetics downstream of the electric furnace.

Figure 2:
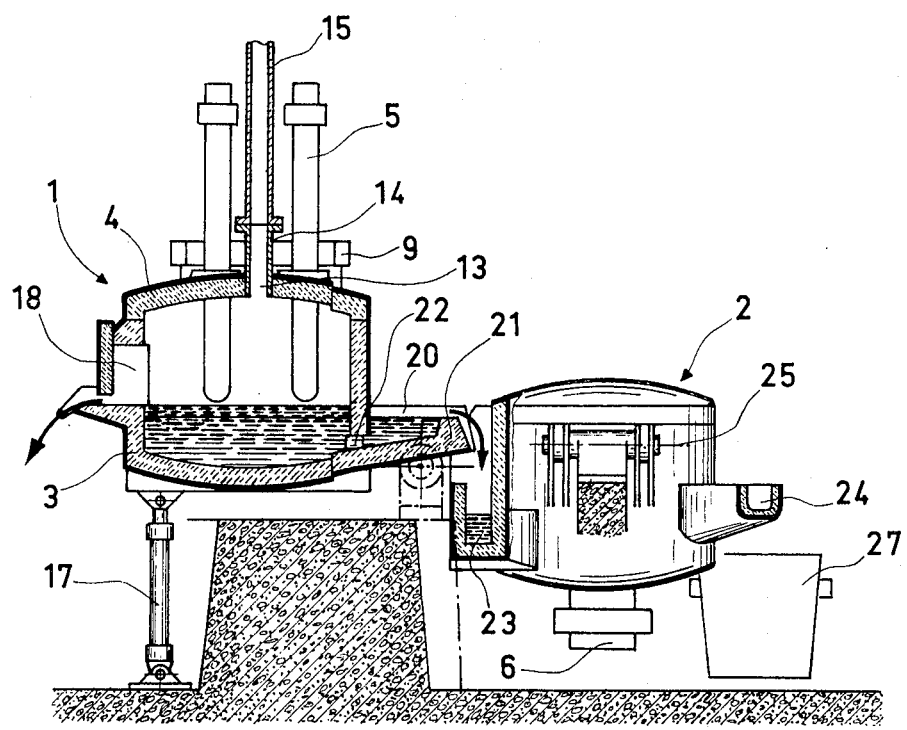

The above and other features, advantages and objects of the present invention will become more apparent from the following detailed description of a now preferred embodiment, presented by way of example, in conjunction with the accompanying drawing wherein FIG. 1 is a top view of the apparatus and FIG. 2 is a side elevational view, partly in section, of the apparatus.

Referring now to the drawing, the illustrated two-stage installation comprises first furnace 1 constituting the first stage and adjoining second furnace 2 constituting the second stage of the apparatus. The first furnace is an electric arc furnace comprising a bottom 3 defining the furnace interior, a vaulted roof 4 covering the same, and electrodes 5 passing through the roof into the interior of the furnace. The second furnace is an electric induction furnace equipped with induction heater 6 of the type known as a "channel inductor."

Electrodes 5 are mounted on support arms 7 which are movable along guide posts 8. The vaulted roof may be displaced to give completely free access to the interior of the furnace, the illustrated displacement means for the roof comprising a movable frame 9 and ram 10, such as is well known in the art. The assembly constituted by roof 4, electrodes 5, support arms 7 and guide posts 8 may be turned about the axis of the ram so that it is located in the open position indicated by chain-dotted lines $d$ in FIG. 1. The electrodes are connected by flexible cables 11 to transformer 12 feeding electric power to the electrodes.

Vaulted roof 4 defines central port 13 communicating with fixed feed tube or channel 14 arranged to be placed in communication with detachable tube or channel 15. Port 13 serves as inlet for feeding solid products to be melted and/or any other suitable material into the interior of furnace 1 in a manner to be described more fully hereinafter.

Electric arc furnace 1 is equipped with a pivoting arrangement comprising horizontal pivoting axis 16 disposed laterally in respect of the furnace and jacks 17 disposed diametrically opposite the axis on the other side of the furnace, one jack being visible in FIG. 2. Thus, furnace 1 is supported on the pivoting axle and the jacks.

The wall of the furnace bottom adjacent jacks 17 defines closable opening 18 for the purpose of cleaning and/or inspecting the interior of the furnace. Adjacent the pivoting axis, the furnace is equipped with two evacuating spouts 19 and 20, the pivoting axis being disposed in the immediate proximity of the ends of the respective evacuating spouts. One of the spouts 20 has a weir 21 at its ends and communicates with the interior of the furnace by port 22 whose upper wall is positioned at a lower level than the level of weir 21 when the furnace is in its substantially horizontal position. This produces a siphon effect when the furnace contains a liquid bath whose level is that fixed by weir 21, port 22 being immersed in the liquid. The other evacuating spout 19 is of a structure similar to that of conventional electric arc furnaces. Each evacuating spout may be closed at will be a lime barrier.

The induction heated furnace 2 is provided with a feed well 23 and an evacuating spout 24. Furnace 2 may be pivoted about eccentric axis 25 passing adjacent the end of spout 20 of furnace 1, this spout end being disposed to open into feed well 23.

As is particularly apparent from FIG. 1, the molten metal from first furnace 1 may be feed at will either to second furnace 2 through spout 20 or into vessel 26 through spout 19. Second furnace 2 may be emptied through spout 24 into vessel 27.

The above described apparatus may be operated in three different ways, as will now be described in detail:

1. Conventional batch operation

Briefly and schematically, the interior of furnace 1 is filled with a solid product rich in iron, feed tube 15 is detached, the furnace is closed, the charge is molten, one or more slag layers are formed to refine the molten charge, the charge temperature is properly adjusted and the refined metal is removed from the furnace. This involves one or more removals of slag, which is effectuated through opening 18 by pivoting furnace 1 backwardly or counterclockwise about axis 16, the pivoting angle being small, for instance of the order of 7°. Port 22 is temporarily blocked by a lime barrier during these operations, and the refined metal is discharged through evacuating spout 19 into vessel 26 pivoting the furnace forwardly, i.e., clockwise, through an angle of about 40°. A portion of the refined metal may also be discharged into induction heated furnace 2 which plays the role of a temperature maintaining furnace in this case. The particular treatment conditions in this operation are well known to operators of electric arc furnaces and will be regulated according to the type of steel desired. Since they form no part of the present invention, they will not be described.

It is known that the energy requirement of such an operation are not optimal because of the great thermal variations required in the furnace, which variations are damaging to the refractories of the furnace walls and involve considerable irregularities in the electric energy needs. Furthermore, the electric power transformer feeding energy to the electrodes must produce a high energy during the periods of melting and is, therefore, poorly utilized during the refining periods which require much less energy. This type of operation has other disadvantages.

2. Continuous operation

If conditions permit, the apparatus will be operated in a continuous melting and refining cycle. In this type of operation, the solid iron product is fed into first furnace 1 substantially continuously through port 13 so that an excess of solid product is always maintained in the interior of the furnace in the presence of a molten metal bath, the electric arcs being maintained essentially between the electrodes and the liquid metal. The liqquid metal is continuously discharged without pivoting furnace 1 by flowing over weir 21 into induction heated furnace 2. This operation permits transformer 12 to be maintained permanently near its maximal power and to maintain the interior of the electric arc furnace at a relatively constant temperature, which avoids thermal shocks damaging to the life of the refractory walls of the furnace. Furthermore, the permanent presence of an excess of solid metal in the interior of furnace 1 keeps the temperature of the metal bath therein relatively low. Furthermore, the solid metal products fed into the furnace and maintained at an excess protect the furnace walls from direct heat radiation from the electric arcs.

Feeding of the furnace with solid material may be continuous or semi-continuous as long as there is a permanent excess of solid material in contact with the metal bath in the furnace. The slag formed in the course of the melting operation is also discharged continuously by overflow. During the continuous operation of the apparatus in the above-described manner, spout 19 is blocked by a lime barrier.

This type of operation is particularly well adapted to an installation where it is coordinated over an extended period of time with a downstream operation of high productivity, such as continuous casting. Nevertheless, it is operated best with pre-reduced solid products or conditioned scrap iron although the electric arc furnace may be adapted to charges of relatively large scrap iron pieces while still enabling a continuous operation to proceed. Of course, the furnace may be charged in a variety of ways, for instance laterally.

3. Semi-continuous operation

The use of very large pieces of scrap iron as a charge for electric arc furnaces with removable vaulted roofs requires a batch or semi-continuous operation. The semi-continuous operation retains the advantages of the conventional batch operation as far as charging of the furnace is concerned, while attaining certain advantages of the continuous operation, both described hereinabove.

In the semi-continuous type of operation, a batch of a solid charge is fed into furnace 1 and is completely molten therein, the necessary power for this operation being kept substantially constant after the starting period. After the melting operation has been completed, the molten metal is discharged into induction heated furnace 2 by pivoting the electric arc furnace 1 and the refining operation is then effectuated in furnace 2. While this proceeds, the next batch may be molten in furnace 1, the possibility remaining of melting and refining the charge in furnace 1 if the production program makes this desirable or if the metallurgical treatment in the induction heated furnace permit the interposition of such a full cycle of operation in the electric arc furnace.

It must be remembered, in this connection, that the melting and refining operations are not completely distinct in practice. Thus, it is possible to effectuate certain metallurgical operations other than melting in the electric arc furnace in the above-described continuous and semi-continuous tyes of operations, such as oxidizing operations designed to lower the phosphorus, nitrogen and hydrogen content of the metal bath, or even to decarburize the metal bath. In this case, the operations in the induction heated second furnace are primarily deoxidizing and nuancing operations.

What is claimed is:

1. A metallurgical apparatus for melting and refining solid products rich in iron to transform them ito liquid steel, comprising
    1. a first furnace for melting and refining the solid products and having two spouts each having a discharge end for evacuating the resultant liquid metal from the furnace, and
    2. a second furnace adjoining the first furnace and having an inlet port,
        a. the first furnace being arranged for pivoting between a horizontal and a tilted position about a horizontal axis disposed laterally in respect of the first furnace to permit transfer of the liquid metal from the first to the second furnace, the pivoting axis being disposed in the immediate proximity of the ends of respective ones of the evacuating spouts, and
        b. one of the evacuating spouts having a weir at the discharge end to produce a siphon effect on the horizontal position and being arranged to cooperate in the horizontal position with the inlet port of the second furnace to permit continuous transfer of the liquid metal from the first to the second furnace, and the other evacuating spout pouring the liquid metal out of the first furnace in the tilted position thereof.

* * * * *